C. W. BOWEN.
HEEL LIFT CUTTING AND ASSEMBLING MACHINE.
APPLICATION FILED DEC. 9, 1912.

1,288,489.

Patented Dec. 24, 1918.
6 SHEETS—SHEET 1.

Fig. 1.

C. W. BOWEN.
HEEL LIFT CUTTING AND ASSEMBLING MACHINE.
APPLICATION FILED DEC. 9, 1912.

1,288,489. Patented Dec. 24, 1918.
6 SHEETS—SHEET 3.

C. W. BOWEN.
HEEL LIFT CUTTING AND ASSEMBLING MACHINE.
APPLICATION FILED DEC. 9, 1912.

1,288,489.

Patented Dec. 24, 1918.
6 SHEETS—SHEET 4.

C. W. BOWEN.
HEEL LIFT CUTTING AND ASSEMBLING MACHINE.
APPLICATION FILED DEC. 9, 1912.

1,288,489.

Patented Dec. 24, 1918.
6 SHEETS—SHEET 6.

UNITED STATES PATENT OFFICE.

CHARLES W. BOWEN, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

HEEL-LIFT CUTTING AND ASSEMBLING MACHINE.

1,288,489.         Specification of Letters Patent.     Patented Dec. 24, 1918.

Application filed December 9, 1912. Serial No. 735,750.

*To all whom it may concern:*

Be it known that I, CHARLES W. BOWEN, a citizen of the United States, and resident of Lynn, in the county of Essex and State of Massachusetts, have invented certain new and useful Improvements in Heel-Lift Cutting and Assembling Machines, of which the following is a specification.

This invention relates to a machine for use in connection with the operation of building a heel or heel-pile by the superposition of a series of lifts or thicknesses of sheet-material.

In Letters Patent of the United States No. 1,146,996, granted July 20, 1915 to the present applicant, a heel-building machine is disclosed in which heel-lifts are stacked in a series of magazines equal in number to the number of lifts required to produce a single heel-pile, and at each cycle of operations of the machine an assembling device moves through a predetermined path beneath the magazines and abstracts from each magazine a single lift, collecting the lifts in superposed relation so as to produce a heel-pile. One object of the present invention is to produce a machine by which heel-piles are formed automatically, as in the machine of said patent, by the collection of a series of lifts automatically supplied in the proper order and number, but in which the assembling mechanism is relieved of the duty of abstracting the lifts from stacks or other ultimate sources of supply.

To the foregoing end it is proposed to provide the machine of the present invention with means for holding in position, ready to be assembled, a single series of heel-lifts sufficient for a single heel-pile, and with means acting, at each cycle of operation, to supply a fresh series of lifts to said holding-means, the assembling-devices operating on each series of lifts so supplied to produce a single complete heel-pile therefrom.

Another object of the present invention is to provide a machine capable of cutting at one operation a series of lifts sufficient in number and of the proper sizes to form a heel of any desired style, and of then assembling such lifts in the form of a heel blank in a connected operation so timed as to occur between successive acts of the cutting means. The invention in its preferred form, comprises an organized machine having the following elements; means for cutting a series of lifts preferably, although not necessarily, of graded sizes, means for simultaneously transferring such lifts to an assembling station, and assembling devices, or series of devices so arranged and operated as to receive the lifts so transferred and pile them together in proper arrangement to form a heel alternately of the required design. To the foregoing may be added suitable guides for positioning the lifts in proper relation to one another to form a heel pile of the desired form, and pasting or gluing and nailing means whereby the assembled lifts are secured together. A machine having the foregoing characteristics is embraced within the intended scope of my invention and of the appended claims. In the drawings accompanying this specification, I have shown a machine containing the preferred form of means for accomplishing my objects.

In the drawings.

The same reference characters indicate the same parts in all the figures.

I will describe in detail the particular machine illustrated and in doing so explain the general principles of the invention exemplified thereby.

Figure 1:
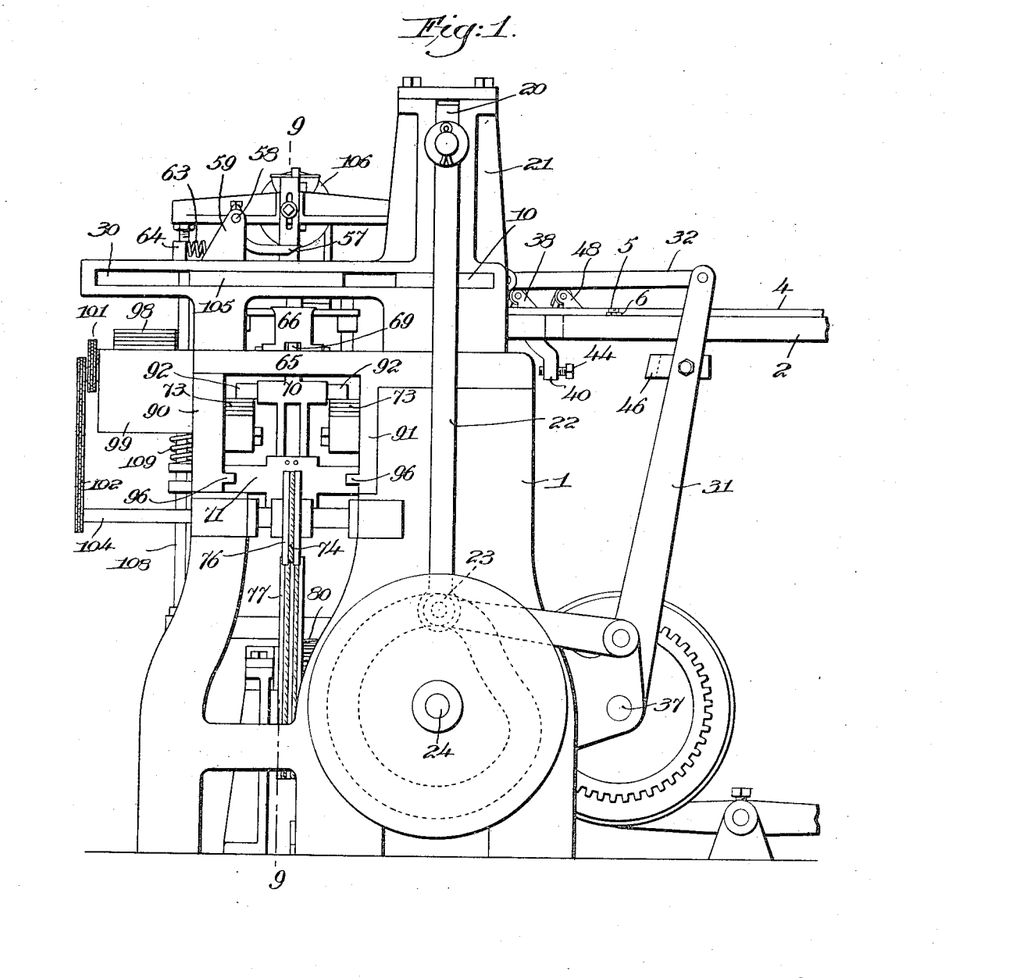
Figure 1 is a side elevation of the machine.
Figure 2:
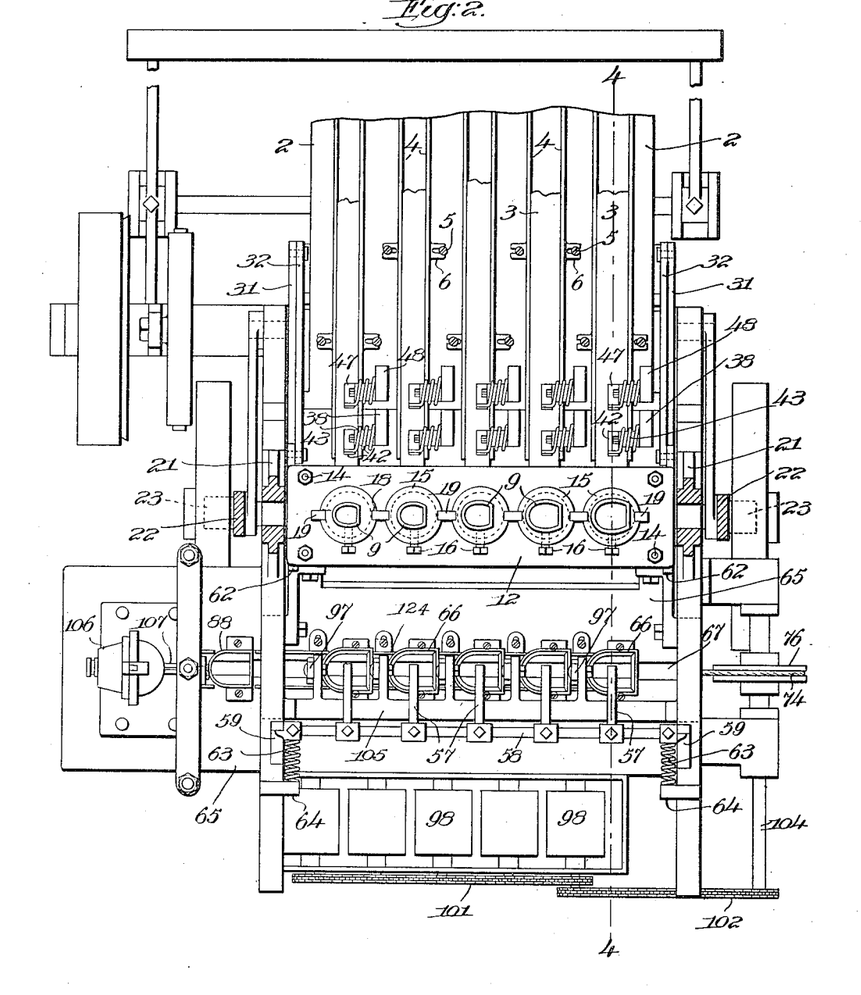
Fig. 2 is a plan view of the machine.
Figure 3:
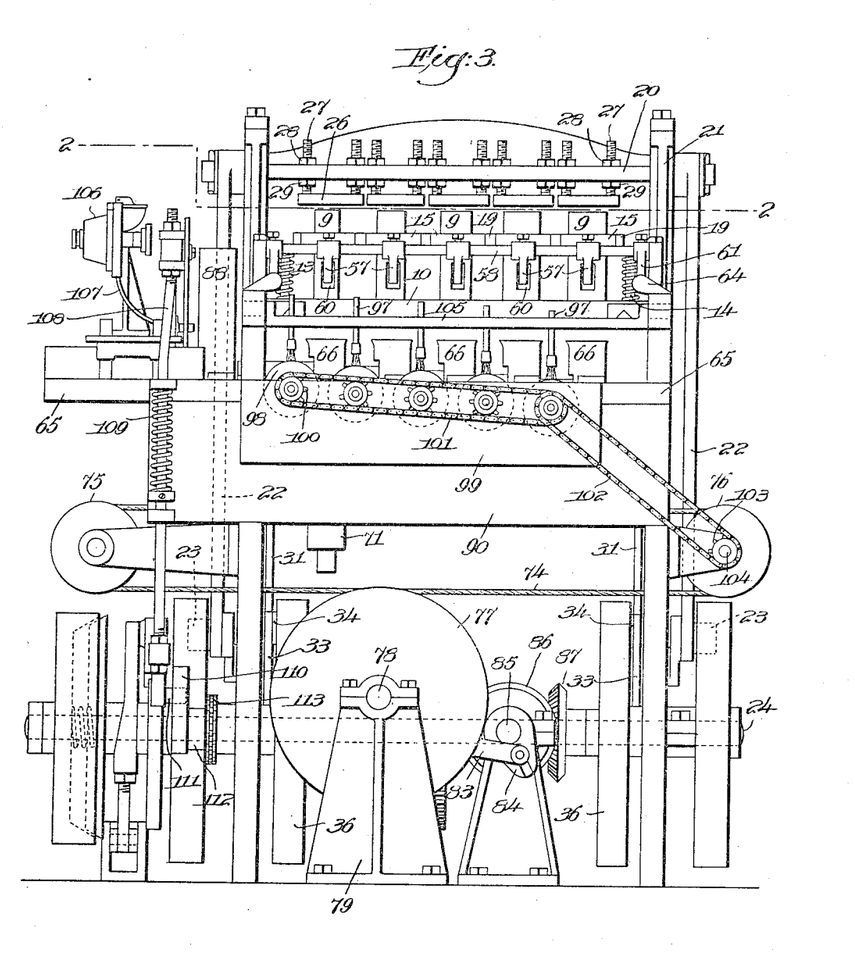
Fig. 3 is a rear elevation.
Figure 6:
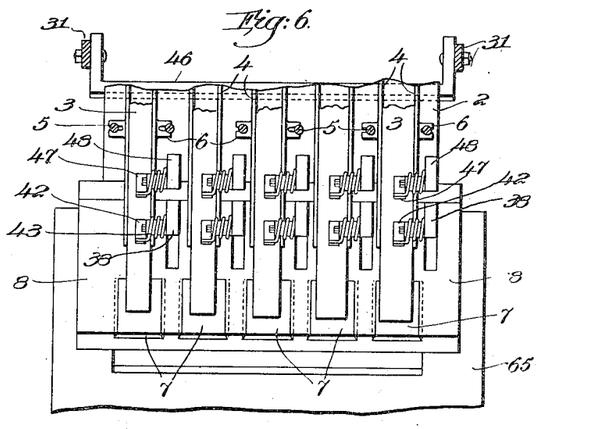
Fig. 6 is a plan view of the feeding mechanism for the material from which the lifts are cut.
Figure 7:
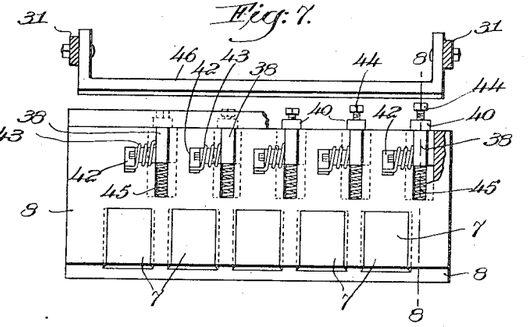
Fig. 7 is a plan view of the same mechanism in a different position.
Figure 8:
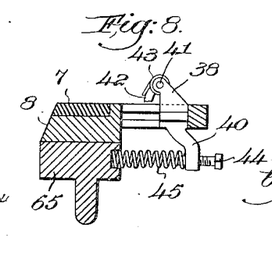
Fig. 8 is a detail sectional view of the feeding mechanism on line 8—8 of Fig. 7.

The structure of the machine includes a frame or base 1 of any suitable character and made in any way desired, and this frame supports a table 2 whereon strips of sheet material from which heel lifts are to be cut are laid, as shown at 3 in the plan view of Fig. 2. These strips are cut, by a preliminary operation, usually from a sheet of heel stock material such as leather board. On the table are mounted guides 4 arranged in pairs, each of which pairs provides a channel to define the path in which a strip may move. The adjustment of the guides, being permitted by attaching screws 5 which pass through slotted ears 6 on the guides into the table, permits these channels to be widened or narrowed in correspondence with the width of the strips which they accommodate. Usually the width of each strip is approximately the same as one of the dimensions of the lift to be cut therefrom. For producing heels of certain styles, the "Cuban" or "military" for example, the series of strips are of graded widths as illustrated in Figs. 2 and 6. These strips are fed over cutting blocks 7 set into a part of the table or a beam 8 at the rear edge of the table. Directly over the cutting blocks 7 is a cutter holder or carrier 10. The cutting mechanism supported by the carrier 10 may conveniently, although not necessarily, be composed of tubular die members 9 having the outline in cross section of a heel lift and having the edges at the lower end sharpened as shown at 11 in Fig. 5. Where the table is of metal the cutting blocks 7 are preferably of wood, or at any rate of some material which will not injure the edge of the die when the latter is pressed against it after passing through the stock. Preferably also there are as many cutting blocks as there are dies, and each block is slid into a dove-tailed channel in the supporting beam 8 beneath the die, as indicated in Figs. 6 and 7.

Figures 4, 5:
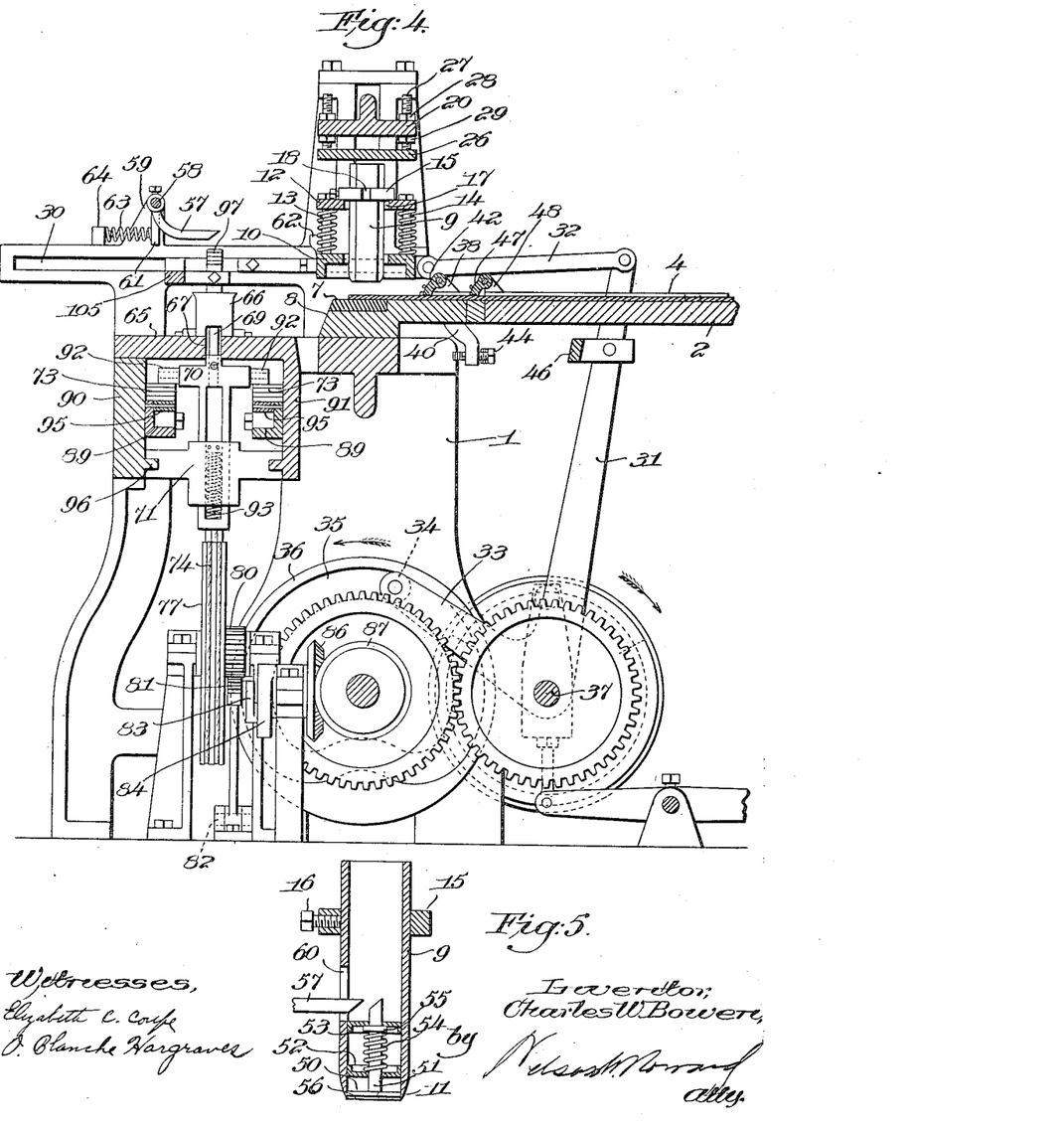
Fig. 4 is a longitudinal vertical central section of the machine.
Fig. 5 is a sectional view somewhat enlarged showing one of the cutting dies in detail.

The number of dies 9 in one machine is equal to the entire number of lifts required to make a complete heel blank, and the sizes of these dies may be graded from one end of the series to the other, as shown in Fig. 2, in accordance with the character of the heel to be made. The dies are all removably supported by the die carrier 10 so that any one may be removed and replaced by another of different size; this in order that lifts to make a heel in any size and degree of taper may be produced with the minimum excess of stock to be subsequently trimmed away. To permit of ready removal and replacement of the dies, the holder and dies are conveniently made as shown in Fig. 4. The carrier comprises in its construction a base or beam 10 at the bottom and a plate 12 supported on said beam by springs 13 and held relatively thereto by bolts or rods 14 secured in the beam, and passing through the plate 12, being surrounded by the springs 13 and having heads overlying the plate 12. The dies as before mentioned are steel tubes of desired outline, and to each is secured a collar 15 by a set screw 16, the collar being adapted to rest on the plate 12 while the die passes through an aperture 17 in the plate. In the collar 16 are notches 18 which are entered by lugs 19 on the plate and position the die. In this machine the dies are all held with their flat sides facing the same way in order that the lifts may all be placed correspondingly when assembled together. The dies also are spaced at predetermined and equal distances apart from one another for a purpose important in connection with one embodiment of the assembling mechanism as will hereinafter appear.

At proper times the dies are depressed in unison toward the material lying on the cutting blocks, and for so depressing them I provide a cross head 20 arranged to slide in guideways in uprights 21 and overlying the upper ends of the dies. The mechanism here shown for operating the cross head consists of rods 22 connected to trunnions on the end of the cross head and carrying studs 23 engaging in grooves in cams 25 and which are mounted upon the cam shaft 24. The cross head carries adjustable plates 26 each adapted to bear against the upper end of one of the dies, said plates being adjustable by means of screws 27 and nuts 28, 29, the screws being secured to the plates 26 and passing through the flanges or lips of the cross head, and the nuts 28, 29 being respectively above and below such lips. These adjustable plates are provided to serve as a means for regulating the pressure on the dies to make such pressure uniform regardless of the length of the dies. For instance it will be appreciated that some dies may wear faster than others and require more frequent sharpening and as a consequence it is practically impossible to have all the dies of the same length. For this reason also the collars 15 which support the dies on the upper plate of the holder are likewise adjustable. In the actuation of the dies by the cross head, the springs 13 are compressed, and when the cross head rises these springs restore the dies to their former positions. Each die in rising carries the lift, cut by the downward movement, in its lower end.

The dies are then moved to the rear to transfer the cut lifts from the location of cutting to the lift assembling station. This transfer is permitted by supporting the die carrier in horizontal guideways 30 in the ends of the machine frame. The actuation of the carrier is accomplished by levers 31 connected with the carrier by links 32 and having arms 33 provided with rollers 34 which engage in grooves 35 of cams 36. The fulcrum of the levers 31 may be the driving shaft 37 which actuates the cam shaft 24.

The same mechanism also feeds the strips 3, advancing the strips far enough for another cut while the previously cut lift is being transferred. In the drawings there is shown mounted beside each strip channel a slide 38 contained in a guide in the table from which an arm 40 depends. To the slide 38 is connected a stud 41 which extends laterally over the strip channel and carries a feed dog 42 pressed upon by a spring 43. The arm 40 carries an adjustable stop screw 44 and is pushed toward the front of the machine by a spring 45. Connected to the two levers 31 is a bar 46 at the height of the stop screws 44. When nearing the rearward limit of its movement the bar 46 engages the stops 44 of the several feed dog slides and pushes these slides rearwardly. The dogs 42 engage the several strips and, in moving, feed them. When returning, the dogs yield and slip over the strips, which are prevented from slipping back by holding dogs 47, similar to the feeding dogs 42 except that they are mounted upon fixed uprights 48 on the table. Adjustment of the stops 44 is provided in order that the amount of feed given to the strips may be regulated to the width of the lifts to be cut from them and danger of wasting the stock avoided. The further a stop approaches toward the bar 46, the greater is the amount of feed movement given to the corresponding dog and to the strip fed thereby. Regulation of the amount of feed is necessary because different sizes and widths of lifts may be cut from the strips in the same locations according to the sizes and styles of heel to be made. By comparing the positions of the stops of the several feed dogs with one another as they are represented in Fig. 7, it will be seen that the dogs which feed the strips from which the largest lifts are cut are first engaged by the bar 46 and that strips for the smaller lifts are fed at successively later intervals.

After the die carrier has been moved as previously described to transfer the cut lifts to the assembling station the lifts are dislodged from the dies by any suitable mechanism, a practical one being shown in Figs. 4 and 5. By reference to the latter figure, the die will be seen as containing an ejector 50 fastened to a shank 51 which is adapted to move in guides 52 and 53 secured removably in the die. A spring 54, bearing against the lower guide 52 and against a collar 55 on the shank, holds the ejector far enough within the end of the die to admit the lift 56. Knocker arms 57 are secured to a rock shaft 58 held in uprights 59 at the sides of the machine frame, and the knocker arms are so spaced that each is adapted to enter an opening 60 in the side of the die corresponding thereto when such die is transferred as described. Attached to the shaft near its ends are arms 61, and in line with such arms are projections 62 on the carrier which strike the arms when the die carrier reaches the end of the travel and after such arms have entered the dies. This has the effect of depressing the arms against the upper ends of the ejector shanks and causing the ejectors to dislodge the lifts from the several dies. The knocker arms are held in the position in Fig. 4, so that they may ride over the ends of the corresponding ejector shanks, by springs 63 which bear against the arms 61 and against lugs 64 on the machine frame. Suitable stops, as shown in Fig. 2, limit the forward movement of the arms 61 under the influence of the springs 63. These springs allow the knocker arms to be depressed against a yielding resistance and restore them to normal position when the die carrier returns into the cutting position.

When the lifts are ejected from the dies they fall toward an assembling bed 65, passing first into guides 66 which position them properly with respect to the assembling device or devices presently to be described. The illustrated guides have the form of hoppers, placed across a longitudinal slot 67 in the assembling bed. In the lower parts of these hoppers registering with the slot 67 are vertical slots or notches 68 through which an assembling finger 69 may pass. This finger is mounted upon a post 70 held by a carriage 71 and is moved along the line of hoppers from a point beyond the position in which the largest lift falls to one beyond the hopper for the smallest lift. In thus moving the finger takes a lift from the bottom of each hopper and carries it beneath the successive hopper, piling the lifts one upon another until lifts have been taken from all, the accumulation of lifts forming a pile of lifts in the form of a heel blank of predetermined contour. Each of the hoppers 66, except the first one of the series, contains supporting means 72 of such height that the lift or pile of lifts coming from preceding hopper may pass under the lowest lift in that hopper. The bed 65 and the supports 72 within the hoppers form a series of shelves to which the lifts are delivered which, it will be observed, all lie in parallel planes and together operate as a guide to assist in insuring a proper collection of the row of lifts delivered thereto from the cutting dies which have previously served to hold the lifts. The finger 69 is meanwhile guided by a cam track 73 so that after passing each hopper its upper end rises sufficiently above the pile of lifts ahead of it to push out the lowermost lift in the next hopper.

Figure 9:
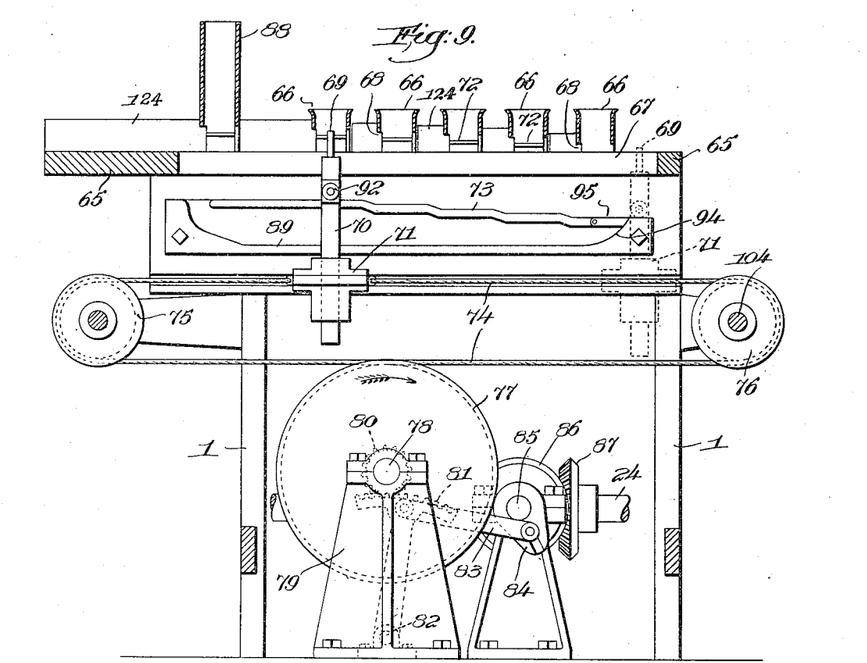
Fig. 9 is a sectional view on line 9—9 of Fig. 1 showing one embodiment of the assembling means.

A convenient mechanism for moving the assembling finger is shown best in Figs. 4 and 9. This mechanism consists of a belt or cable 74 connected at its opposite ends to opposite sides of the carriage 71 and passing around pulleys 75 and 76 and a driving drum 77. Such drum is mounted upon an axle 78 having bearings in uprights 79 and carrying a gear pinion 80. Said pinion is in mesh with the teeth of a gear segment 81 mounted to oscillate upon a pivot 82 and engaged through a connecting rod 83 with a crank arm 84 on a stud shaft 85 which is driven by bevel gearing 86, 87 from the shaft 24. The swing of the segment 81 and the gear ratio are so proportioned that the assembling finger travels the whole length of the series of hoppers and back during each rotation of the shaft 24, this operation ocurring during the time that the die carrier is returning after discharging the lifts and the dies are being operated to cut other lifts.

In this way the assembling finger in each operation collects all of the lifts cut by the series of dies in the preceeding cutting operation of the cycle. When the assembling device has passed the line of hoppers 66 and in addition thereto a magazine 88 which may, if desired, contain grain top pieces, it drops from the upper guide or track to a lower track 89. These tracks as here shown are made in duplicate and are fastened to the inner sides of ribs or beams 90, 91 of the machine frame, as shown best by Fig. 4. The bar 70 has projections carrying rolls 92 which rest on the tracks, and are held against the same by a spring 93 contained in a channel in the bar 70 and pressing downwardly against the end of such channel, the reaction of such spring being taken by a plug set into the carriage 71. The tracks 73 terminate at such a point that before the assembling finger reaches the end of its operative travel, the rolls fall from the tracks 73 to the tracks 89. At the end of the return stroke the rolls run up an incline 94 on the tracks 89 past a switch 95 in the tracks 73, and are ready to travel on the latter tracks again. The carriage 71 travels in an unvarying path, being guided by tongues or ribs 96 entering grooves in its sides.

The lifts which are collected in the form of a heel pile must be secured together to hold them in heel form for the compressing operation, and since an adhesive is the most suitable medium for this purpose I provide means for applying paste or glue upon the faces of the lifts before they are assembled. The means here shown comprise brushes 97 each arranged beside one of the hoppers 66 in position to wipe over the upper face of the lift emerging from that hopper. These brushes are replenished from supply rolls 98, which turn in a glue tank 99 at the extreme rear of the machine. They are rotated by sprockets 100 on their axles, which sprockets are driven by a connecting chain 101 and a drive chain 102 passing around a drive sprocket 103 on the shaft 104 of the guide pulley 76. The brushes 70 are carried by a frame or slide 105 arranged to travel in the die carrier guides 30 and connected with the die carrier, whereby the die carrier in moving to discharging position carries the brushes across the rolls 98 and on return brings the brushes into position for applying the glue to the lifts. In this machine there is a roll 98 for each brush.

When the heel piles are completed the lifts may be additionally secured by a nail driven through them, by a nailing mechanism arranged beyond the magazine 88. It may be here stated that some shoe manufacturers secure the lifts by nails alone, but it will be observed that the machine of the present invention may be used to secure the lifts together by either nails or paste or by both securing means as may be desired. This nailing mechanism may be of any suitable character, for instance, like that shown in the said Patent No. 1,146,996, and needs no detailed description. It is sufficient to say here that 106 represents the nail magazine of the machine, 107 the race way for conducting nails into driving position and 108 the rod for operating the driver. This rod is moved by a spring 109 to give the driving stroke, and is put into position for driving and at the same time the spring is compressed by a cam 110 engaging a stud 111 on the rod. The cam has a gradual rise and an abrupt drop, so that when the highest point of its surface passes the stud the spring is given free play to give as sharp a stroke to the driver as may be necessary. Cam 110 is on a counter shaft 112 driven by a sprocket 113 and a chain from the main shaft.

Figure 10:
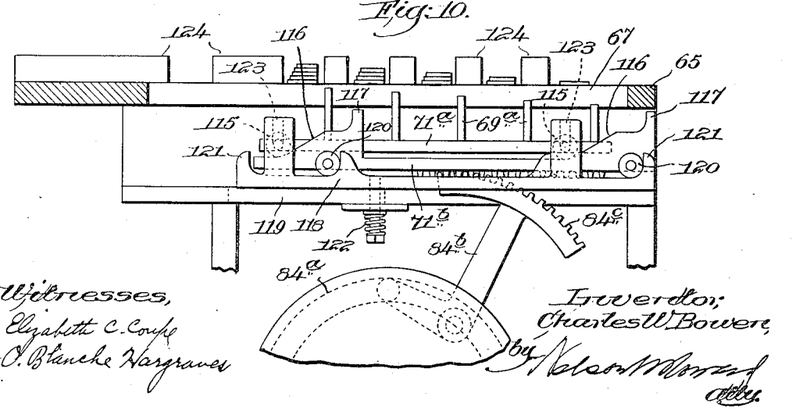
Fig. 10 is a similar view of a modified form of assembling mechanism.
Figure 11:
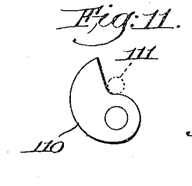
Fig. 11 is a detail view of a cam for the nailing mechanism.

The machine heretofore described in detail and illustrated in Figs. 1 to 9 of the drawings is intended to represent merely one of many possible embodiments of means for performing the desired functions, that is, the functions of cutting and assembling lifts from sheet material. Any other mechanisms or means suitable for accomplishing the same results and within the scope of the appended claims are within the scope of my invention. For instance, it is within my contemplation, instead of the particular means shown for assembling the lifts, to employ another form of mechanism wherein there are as many assembling fingers as there are lift-cutting dies, and the lifts are dropped directly from the dies upon those previously piled up at the assembling station. Such an assembling mechanism is illustrated in Fig. 10, where the fingers are represented by 69$^a$ and are spaced to conform to the spacing of the dies. All of these fingers are secured to a carriage 71ª which is adapted to oscillate back and forth in each cycle of operations a distance about equal to the spaces between adjacent dies. Thus when the lifts are discharged from the dies each falls beside or behind one of the fingers, and the subsequent movements of such fingers through one space transfers the lifts into position beneath the respectively next dies. The fingers after each such movement are depressed below the surface of the assembling bed and carried back under the lifts resting on the bed, to their former position when they again rise ready for another operation. In this way the lifts are moved step by step from beneath the discharge point of one die to the next, and after each step the pile is increased by one lift, so that finally after passing the last die the heel piles are complete. The carriage is reciprocated by a cam 84ª and lever 84ᵇ carrying a gear segment 84ᶜ which meshes with a rack on a sub carriage 71ᵇ. Rolls 115 on carriage 71ª coact with cam surfaces 116 on the sub carriage, such surfaces being in part inclined and terminating in abrupt stops or shoulders 117. The sub carriage is adapted to travel on a slide 118, which rests on a sub-bed 119, and such carriage has anti-friction rolls 120 contained between stops 121 on the slide. A friction device 122 engaging the slide and sub bed restrains the movement of the slide. Upright guides 123 on the slide are engaged by projections on the carriage 71ª and prevent horizontal movement of the latter relatively to the slide. The operative movement of this form of assembler commences from the position shown in Fig. 10, with a swing to the left of segment 84ᶜ. This causes sub carriage 71ᵇ to move in the same direction, carrying the cam inclines 116 under rolls 115 and raising carriage 71ª till fingers 69ª project above the bed. When this happens, the rolls 120 engage the left-hand stops 121 and further movement of the sub carriage moves the slide 118, carrying fingers 69ª bodily to the left. On the back swing of the segment, the sub carriage is returned, first lowering carriage 71ª till the fingers 69ª are below the bed, and then returning the slide and all the fingers to the first position. With this form of assembler it is unnecessary to provide any means for holding lifts above the bed so that other lifts may travel beneath them. Side guides 124 may be provided, however, for alining the superposed lifts properly. Such guides may be plates or the like on the bed on each side of the line of travel of the blanks, which are so inclined as to converge upwardly and also, if necessary, to converge in the direction of travel. Such side guides 124 may be used in the preferred construction if desired as shown in Figs. 2 and 9.

The assembling mechanism just described and illustrated more particularly in Fig. 10 is not claimed specifically herein as this part of the invention forms the subject matter of a divisional application Serial No. 153,441, filed March 8, 1917. Likewise, the novel strip feeding mechanism, and its related features, forms the subject matter of a second divisional application Serial No. 153,442, filed March 8, 1917.

Likewise other modifications, in the mode of feeding the strips, in the mode of driving mechanisms, and in other features as well, have been considered by me and are included within my invention.

The method of making heels, disclosed in this application, which comprehends procuring sufficient heel-lift blanks to form a complete heel, depositing said lifts in a row to facilitate an immediate collection in a stack and then stacking said lifts, is not claimed herein as it forms the subject-matter of a divisional application Serial No. 164,053 filed April 23, 1917. The further method of making heels, disclosed in this application, which comprehends depositing successive series of heel-lifts and delivering a completed heel at each successive depositing operation, is not claimed herein as it forms the subject-matter of another divisional application Serial No. 245,481, filed July 18, 1918.

Any material suitable for the manufacture of heels may be used to provide the strips from which the lifts are cut, such as leather, leather board, etc., but ordinarily leather board or a material of similar nature will be used. The strips may be of uniform thickness or of wedge shape, that is, of greater thickness at one longitudinal edge than the other, or some strips may be even and others wedge shaped according to the character of heel to be built, and the relative arrangement of even strips and wedge strips in the several guides 4 corresponds to the arrangement or sequence of plain lifts and wedge lifts in the heel.

In this connection particular attention is called to the use, throughout the specification and claims, of the term "lift" to designate the blanks which form the layers of the heel pile produced by the machine. This term is used herein in an inclusive sense as defining any blank capable of being utilized in building heels, irrespective of the particular shape which the blanks may have when they are first collected in the form of a heel blank. The invention is not limited to the details of construction and operation of the illustrated embodiment, nor to the conjoint use of all its features, but may be embodied in other forms within the terms and spirit of the claims.

What is claimed as new, is:

1. A heel building machine comprising a series of shelves in a row to support lifts at separated stations, intermittently operating means for depositing a series of lifts on said shelves, means for pasting the lifts, lift assembling mechanism including means for engaging and removing the lifts from said shelves by advancing them in the line of the row, and mechanism for operating said lift engaging means in the periods between the lift depositing operations.

2. A machine for cutting and assembling heel lifts comprising cutting mechanism arranged and adapted to cut from sheet material individual lifts, graded as to area, in sufficient number to build a heel, and lift assembling mechanism constructed, arranged and operating to assemble the several lifts in a superposed symmetrical relation to form a heel blank for a tapered heel.

3. A heel building machine comprising a series of cutting dies arranged in predetermined order, means for causing said dies to cut lifts from sheet material, assembling mechanism, and separate means for transferring the lifts to said assembling mechanism and for ejecting the lifts from the dies.

4. A lift cutting and assembling machine comprising, an assembling bed, lift assembling means movable along said bed, lift cutting dies, mechanism for causing said dies to cut and receive lifts from sheet material, and means for moving said dies to transfer the lifts and deposit them in the path of said assembling means.

5. A machine for cutting and assembling heel lifts, comprising a set of lift cutters, means for feeding a strip of sheet material to each of said cutters, mechanism for actuating said cutters so as to simultaneously cut heel lifts from the material, and means for superposing the several lifts so cut simultaneously upon one another to form a heel blank.

6. A machine of the character described comprising a series of lift cutting dies of tubular form having cutting edges on their ends, supporting means for sheet material, means for forcing said dies endwise against the sheet material and said supporting means, means for moving the dies transversely of their length to carry the lifts cut thereby from the cutting position, means for ejecting the lifts from the dies, and movable means for engaging and collecting the lifts so cut in a heel pile.

7. A machine of the character described comprising tubular cutting dies having cutting edges on their ends, a support for material, means for forcing said dies toward said support to sever and receive pieces in the form of heel lifts, means for moving said dies from cutting position to discharging position, means for ejecting the lifts from the dies, and means for engaging and moving a lift ejected from one die into a position beneath the discharging point of another die.

8. A heel blank building machine comprising a series of cutting dies each formed and arranged to cut a heel lift from sheet material, means for transferring lifts so cut from the cutting position to an assembling station, and lift assembling mechanism including an assembling finger arranged to move in a predetermined path along the line of the several lifts, whereby to collect the lifts cut by said dies and pile then one on another in the form of heel blanks.

9. A combined heel lift cutting and heel building machine, having, in combination, lift cutting mechanism constructed and arranged to cut a series of lifts, a series of hoppers for receiving said cut lifts, one lift to a hopper, means for depositing said cut lifts in their respective hoppers, and means for withdrawing lifts from the several hoppers in succession and assembling them to form a heel blank of predetermined contour.

10. A combined heel lift cutting and heel building machine, having, in combination, lift cutting mechanism constructed and arranged to cut a series of lifts, a series of hoppers for receiving said cut lifts, one lift to a hopper, means for depositing said cut lifts in their respective hoppers, means for engaging and withdrawing a lift from each hopper, and mechanism for operating said means to transfer said withdrawn lifts to a common point to build a heel.

11. A combined heel lift cutting and heel building machine, having, in combination, lift cutting mechanism constructed and arranged to cut a series of lifts, a series of hoppers for receiving said cut lifts, one lift to a hopper, means for depositing said cut lifts in their respective hoppers, and automatic means for engaging and withdrawing a lift from each hopper and superposing them on each other.

12. A combined heel lift cutting and heel building machine, having, in combination, a series of lift cutting dies, mechanism for actuating said dies to cut a series of lifts, lift assembling means arranged to travel along the line of the series of dies, means for moving the dies after the cutting operation to a position above the path of travel of said lift assembling means, and means to eject the lifts from the dies into the path of said assembling means.

13. A combined heel lift cutting and heel building machine, having, in combination, a series of lift cutting dies on a movable frame, mechanism for actuating said dies in unison to cut a series of lifts, a series of hoppers for receiving said cut lifts one lift to a hopper, means for reciprocating the dies to and from a position above the hoppers and for ejecting the lifts from the dies into the hoppers, a source of cement supply on the side of the hoppers opposite the dies, a series of cement brushes arranged between the hoppers on the movable frame carrying the dies, and lift assembling mechanism constructed and arranged to engage the lifts in said hoppers and remove them one by one to form a heel blank.

14. A combined heel lift cutting and heel building machine, having, in combination, a graded series of dies for dieing out a graded series of individual heel lifts, means for transferring said lifts while held in the dies to a lift assembling station, means for ejecting the lifts severally from their dies and superposing them in a pile in the form of a heel blank, and means for applying paste to the lifts individually before they are added to the heel pile.

15. A combined heel lift cutting and heel building machine, having, in combination, a plurality of dies operable intermittently to cut heel lifts from sheet material, means for actuating said dies, means for moving said dies with the cut lifts held therein to a lift assembling station, means for ejecting lifts from the dies when at the assembling station and placing them one over another in the form of a heel blank, and means for applying paste to the lifts individually before they are piled.

16. A heel lift cutting and heel building machine, having, in combination, a series of dies for dieing out a series of heel lifts, means for transferring said lifts while held in the dies to a lift assembling station, means for ejecting the lifts severally from their dies, applying paste thereto and superposing them in a pile in the form of a heel blank, nailing mechanism, means for delivering the blanks to said nailing mechanism, and means for operating said mechanism to drive a nail through the lifts composing the blank.

17. A machine for cutting lifts and collecting such lifts into a heel pile comprising, mechanism for cutting separate heel lifts from sheet material, means for transferring the several lifts so cut to a lift assembling station, means for applying paste to said lifts, mechanism including a lift assembling device arranged to move in a predetermined path along the line of the several cut lifts, and means to operate said mechanism, whereby to collect the lifts and pile them upon one another.

18. A machine for cutting lifts and collecting such lifts into a heel pile comprising, cutting mechanism, means for feeding a plurality of strips of sheet material to said cutting mechanism, means for actuating said cutting mechanism to cut a series of heel lifts from the ends of said strips, and means for piling the several lifts so cut upon one another.

19. A machine for cutting lifts and collecting such lifts into a heel pile comprising, cutting mechanism, means for feeding a plurality of separated strips of sheet material graded as to width to said cutting mechanism, means for controlling the feed mechanism so as to advance the strips varying distances proportionate to their width, means for actuating said cutting mechanism to cut a series of lifts graded as to area from the ends of said strips, and means for assembling said series of lifts so cut into a heel pile.

20. A heel building machine, having, in combination, lift assembling means, means for simultaneously delivering in position to be assembled by said means a sufficient number of heel lifts to constitute a single heel, automatic mechanism for operating said assembling means to collect such lifts into a heel pile, and means for securing together the lifts forming the heel pile.

21. A heel building machine, having, in combination, lift assembling means, means for intermittently delivering successive series of heel lifts in position to be assembled by said means, and automatic mechanism for pasting said lifts and operating said assembling means in the periods between the successive deliveries of lifts to collect each series of lifts into a heel pile.

22. A heel building machine, having, in combination, lift assembling means, means for supporting a sufficient number of heel lifts to constitute a single heel in position to be assembled by said means, means for delivering a quantity of lifts all at one time to said supporting means, automatic mechanism for operating said assembling means to collect the lifts so delivered into a heel pile, and means for securing together the lifts forming the heel pile.

23. A heel building machine, having, in combination, means for supporting in a row a sufficient number of heel lifts to constitute a single heel, lift assembling means arranged to travel along the supporting means, means for delivering a row of lifts all at one time to said supporting means, means for applying paste to the lifts, and automatic mechanism for operating said assembling means to collect the row of lifts into a heel pile.

24. A heel building machine, having, in combination, lift assembling means; means for delivering in position to be assembled by said means, a series of lifts adequate for the production of a single heel; means for operating the assembling means to collect such lifts into a heel pile, and means for securing together the lifts forming the heel pile.

25. A heel building machine, having, in combination, means for delivering successive series of lifts in position to be assembled each series comprising a number of lifts equal to the number in a complete heel, and lift assembling means operable in the periods between the lift deliveries to assemble the lifts of said successive series into heel blanks comprising stacks having the lifts piled symmetrically with their breast edges alined vertically.

26. A heel-building machine comprising a series of lift cutting dies; mechanism for actuating said series to cut a plurality of heel-lifts from sheet-material; an assembling-device arranged to travel in a predetermined path; means for transferring the lifts to said path and depositing them in a row therein; and means for causing said assembling-device to move through said path after each such transfer of the lifts, whereby the lifts are collected in a pile.

27. A heel-building machine comprising an assembling-bed; an assembling-device arranged to move along said bed; means for depositing, above said bed, a series of heel-lifts adequate for the production of a heel-pile; means operable, after each such depositing action, to move the assembling-device along the bed and collect the lifts in a heel-pile, and means for applying paste to the lifts before they are collected.

28. A heel-building machine comprising a series of heel-lift supplying devices; means for actuating all of said devices, at each cycle of operations, so as to supply a series of heel-lifts adequate for the production of a heel-pile; means operable, after each such actuation of the lift-supplying devices, to collect together in a single heel-pile, the series of lifts so supplied; and means for attaching the lifts in the heel pile to each other.

29. A heel-building machine comprising a series of receptacles for heel-lifts; means for supplying, to all of said receptacles simultaneously, heel-lifts in a series adequate for the production of a heel-pile; means for applying paste to the lifts; and means for discharging the lifts from said receptacles in the form of a single complete heel-pile.

30. A heel building machine, having, in combination, lift assembling means; means for delivering, in position to be assembled by said means, a number of lifts, each sustained in a different plane, adequate for the production of a single heel; and means for operating said assembling means to advance the lifts edgewise and stack them flatwise in a symmetrical heel pile having one flat side to form the breast of the heel to be produced therefrom.

31. In a heel building machine, the combination of a series of lift holders in a row, lift supporting means comprising a series of shelves in a row arranged to hold the lifts in parallel planes, said lift holders and shelves being adjacent to each other, means for delivering a series of lifts from the holders to said shelves to facilitate a collection of the lifts in a stack, and means for applying paste to the lifts to cause them to adhere to each other when collected.

32. In a heel building machine, the combination with a row of individual lift supports comprising shelves so related to each other as to hold the lifts in parallel planes; lift holders comprising receptacles constructed to engage the peripheries of the lifts therein, extending in a row opposite said shelves, one holder for each shelf, and means for delivering lifts from said holders to their respective shelves, whereby a collection of the lifts in a stack is facilitated.

33. In a heel building machine, the combination of a series of lift holders constructed to confine lifts therein by their edges, means adjacent said lift holders for supporting lifts in position to be assembled, said means being constructed and arranged to support a row of lifts with each lift lying in a different plane, and operating as a guide to assist in collecting the lifts in a stack, and means for delivering a series of lifts to the supporting means.

In testimony whereof I have affixed my signature, in presence of two witnesses.

CHARLES W. BOWEN.

Witnesses:
C. F. BROWN,
ROBERT W. BREED.

Copies of this patent may be obtained for five cents each, by addressing the "Commissioner of Patents, Washington, D. C."